US012639413B2

(12) United States Patent
Bisa et al.

(10) Patent No.: US 12,639,413 B2
(45) Date of Patent: May 26, 2026

(54) SYSTEMS AND METHODS FOR CACHING SPDM-BASED CERTIFICATES

(71) Applicant: Dell Products, L.P., Round Rock, TX (US)

(72) Inventors: Rama Rao Bisa, Bangalore (IN); Dharma Bhushan Ramaiah, Bangalore (IN); Vineeth Radhakrishnan, Palakkad (IN); Mini Thottunkal Thankappan, Bangalore (IN); Shinose Abdul Rahiman, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 394 days.

(21) Appl. No.: 18/177,226

(22) Filed: Mar. 2, 2023

(65) Prior Publication Data

US 2024/0296214 A1     Sep. 5, 2024

(51) Int. Cl.
*G06F 21/00* (2013.01)
*G06F 12/0875* (2016.01)
*G06F 21/33* (2013.01)

(52) U.S. Cl.
CPC .......... *G06F 21/33* (2013.01); *G06F 12/0875* (2013.01); *G06F 2212/1052* (2013.01); *G06F 2212/45* (2013.01)

(58) Field of Classification Search
None
See application file for complete search history.

(56) References Cited

U.S. PATENT DOCUMENTS

| | | | | |
|---|---|---|---|---|
| 11,609,980 | B2 * | 3/2023 | Benedict | ................. G06F 21/78 |
| 2019/0065072 | A1 * | 2/2019 | Dirik | ................... G06F 12/0895 |

| | | | | |
|---|---|---|---|---|
| 2021/0312044 | A1 * | 10/2021 | Berger | .................. G06F 21/445 |
| 2021/0342836 | A1 * | 11/2021 | Cella | ...................... G06N 20/00 |
| 2022/0012187 | A1 * | 1/2022 | Contreras Munoz | ... G06F 21/44 |
| 2022/0124118 | A1 * | 4/2022 | Bangalore Sathyanarayana | ......... H04L 63/1416 |
| 2022/0292203 | A1 * | 9/2022 | Severns-Williams | ........................ G06F 21/57 |
| 2023/0103368 | A1 * | 4/2023 | Vergis | ................. G06F 13/1668 711/154 |
| 2023/0173395 | A1 * | 6/2023 | Cella | .................... G06N 3/0455 463/25 |

(Continued)

OTHER PUBLICATIONS

Diaz-Sanchez, Daniel et al. TLS/PKI Challenges and Certificate Pinning Techniques for IoT and M2M Secure Communications. IEEE Communications Surveys & Tutorials, vol. 21, Issue: 4. https://ieeexplore.ieee.org/stamp/stamp.jsp?tp=&arnumber=8704893 (Year: 2019).*

(Continued)

*Primary Examiner* — Jeremiah L Avery

(74) *Attorney, Agent, or Firm* — Fogarty LLP

(57) ABSTRACT

According to embodiments of the present disclosure, a certificate caching system and method is provided using Security Protocol and Data Model (SPDM)-enabled Baseboard Management Controller (BMC). The system time verification system and method include program instructions that may be executed on an Information Handling System (HIS) to obtain a certificate from a SPDM-enabled device configured in a target computing device, identify a cache associated with the target computing device, determine whether the certificate is a hardware bound certificate, and store the certificate in the cache based upon the determination.

19 Claims, 7 Drawing Sheets

(56) References Cited

U.S. PATENT DOCUMENTS

| 2023/0205562 | A1* | 6/2023 | Basak | ................. | G06F 13/4221 |
| | | | | | 718/1 |
| 2023/0367575 | A1* | 11/2023 | Izzo | ........................ | H04L 9/088 |
| 2023/0394140 | A1* | 12/2023 | Orlando | ................ | G06F 21/554 |
| 2024/0220298 | A1* | 7/2024 | Powell | ................ | G06F 9/45558 |
| 2024/0220639 | A1* | 7/2024 | Sahu | .................... | G06F 21/602 |
| 2025/0141926 | A1* | 5/2025 | Jain | ....................... | H04L 63/105 |

OTHER PUBLICATIONS

Hinarejos, M. Francisca et al. RiskLaine: A Probabilistic Approach for Assessing Risk in Certificate-Based Security. IEEE Transactions on Information Forensics and Security, vol. 13, Issue: 8. https://ieeexplore.ieee.org/stamp/stamp.jsp?tp=&arnumber=8295139 (Year: 2018).*

* cited by examiner

100

102

600

510

CERTIFICATE CACHE MANAGER

602
CACHE CAPACITY DETERMINER

604
CACHE VALIDITY DETERMINER

610
CACHE SCORE

606
RESPONSE TIME

608
INTERFACE IDENTIIFIER

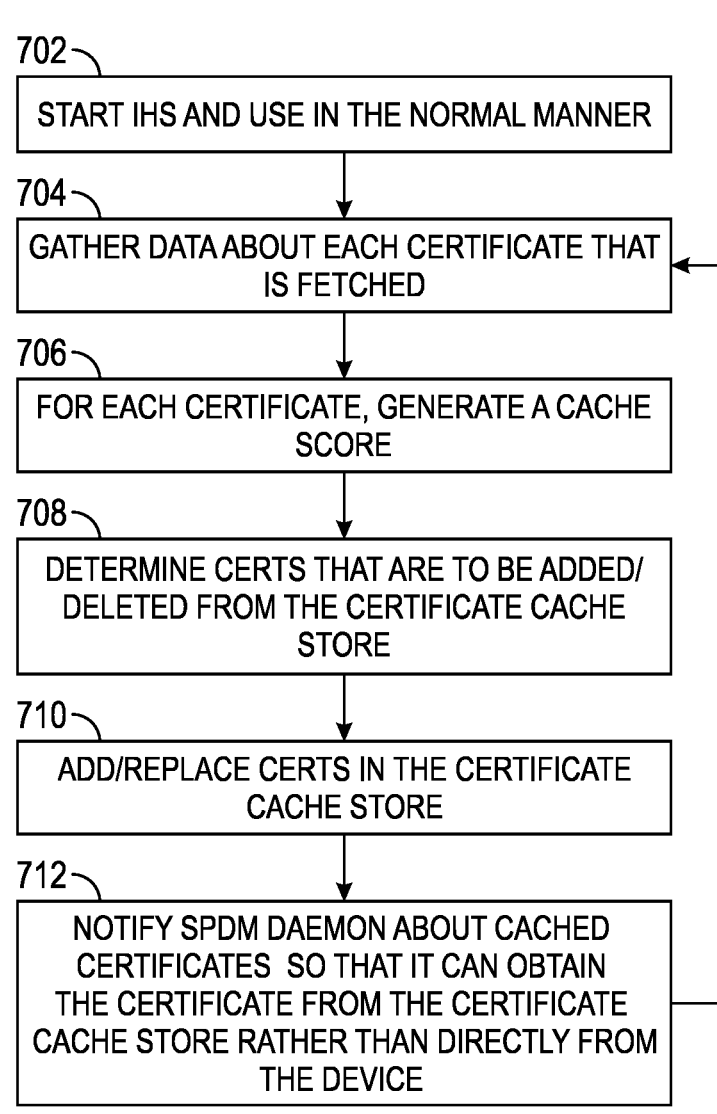

700

702 — START IHS AND USE IN THE NORMAL MANNER

704 — GATHER DATA ABOUT EACH CERTIFICATE THAT IS FETCHED

706 — FOR EACH CERTIFICATE, GENERATE A CACHE SCORE

708 — DETERMINE CERTS THAT ARE TO BE ADDED/ DELETED FROM THE CERTIFICATE CACHE STORE

710 — ADD/REPLACE CERTS IN THE CERTIFICATE CACHE STORE

712 — NOTIFY SPDM DAEMON ABOUT CACHED CERTIFICATES SO THAT IT CAN OBTAIN THE CERTIFICATE FROM THE CERTIFICATE CACHE STORE RATHER THAN DIRECTLY FROM THE DEVICE

FIG. 7

SYSTEMS AND METHODS FOR CACHING SPDM-BASED CERTIFICATES

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Communication networks, and in particular the Internet, has revolutionized the manner in which software is updated on a computer system. Prior to the advent of the Internet, a software provider would package the update on computer readable media, and the computer owner had to obtain a copy of the media to complete the update in order to make the software update accessible to the user of the computer system. However, distributing software updates on computer readable media was often expensive for software providers, which tended to restrict the number of software updates that a software provider would issue. As a consequence, substantial time would pass between updates, and consumers had to manage certain known issues for these time periods, at least until an update became available. Another aspect of this older method was that many modifications were packaged into a single update to reduce the costs associated with distributing the update.

SPDM-based attestation, which has been published by the Platform Management Components Intercommunication (PMCI) Working Group of the Distributed Management Task Force (DMTF), generally involves a security mechanism to remotely detect an adversarial presence on a device to guarantee the device's trustworthiness. Attestation runs as a two-party security scheme in which a trusted party (e.g., the requesting device) assures the integrity of the untrusted remote device (e.g., the responding device). A requesting device, using this scheme, can determine the identity of a device and/or the firmware/software that the device is running. The responding device may send proof about its current state using a cryptographic hash to the requesting device. The requesting device may then evaluate the received evidence with the expected legitimate state of the responding device, and validate whether or not the responding device is trustworthy or not. Many system-on-chip (SOC) platforms now use SPDM-based attestation due in large part, to its light weight and relatively high level of trust provided thereby.

SUMMARY

According to embodiments of the present disclosure, a certificate caching system and method is provided using Security Protocol and Data Model (SPDM)-enabled Baseboard Management Controller (BMC). The system time verification system and method include program instructions that may be executed on an Information Handling System (HIS) to obtain a certificate from a SPDM-enabled device configured in a target computing device, identify a cache associated with the target computing device, determine whether the certificate is a hardware bound certificate, and store the certificate in the cache based upon the determination.

According to another embodiment, a Security Protocol and Data Model (SPDM)-based certificate caching method includes the steps of obtaining a certificate from a SPDM-enabled device configured in a target computing device, identifying a cache associated with the target computing device, determining whether the certificate is a hardware bound certificate, and storing the certificate in the cache based upon the determination.

According to yet another embodiment, a computer program product includes a computer readable storage medium with program instructions stored thereon that may be executed to obtain a certificate from a Security Protocol and Data Model (SPDM)-enabled device configured in a target computing device, identify a cache associated with the target computing device, determine whether the certificate is a hardware bound certificate, and store the certificate in the cache based upon the determination.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 7 illustrates an example SPDM-based certificate caching method showing how certificates may be cached for alleviating bandwidth burdens on communication links according to one embodiment of the present disclosure.

DETAILED DESCRIPTION

Figure 1:
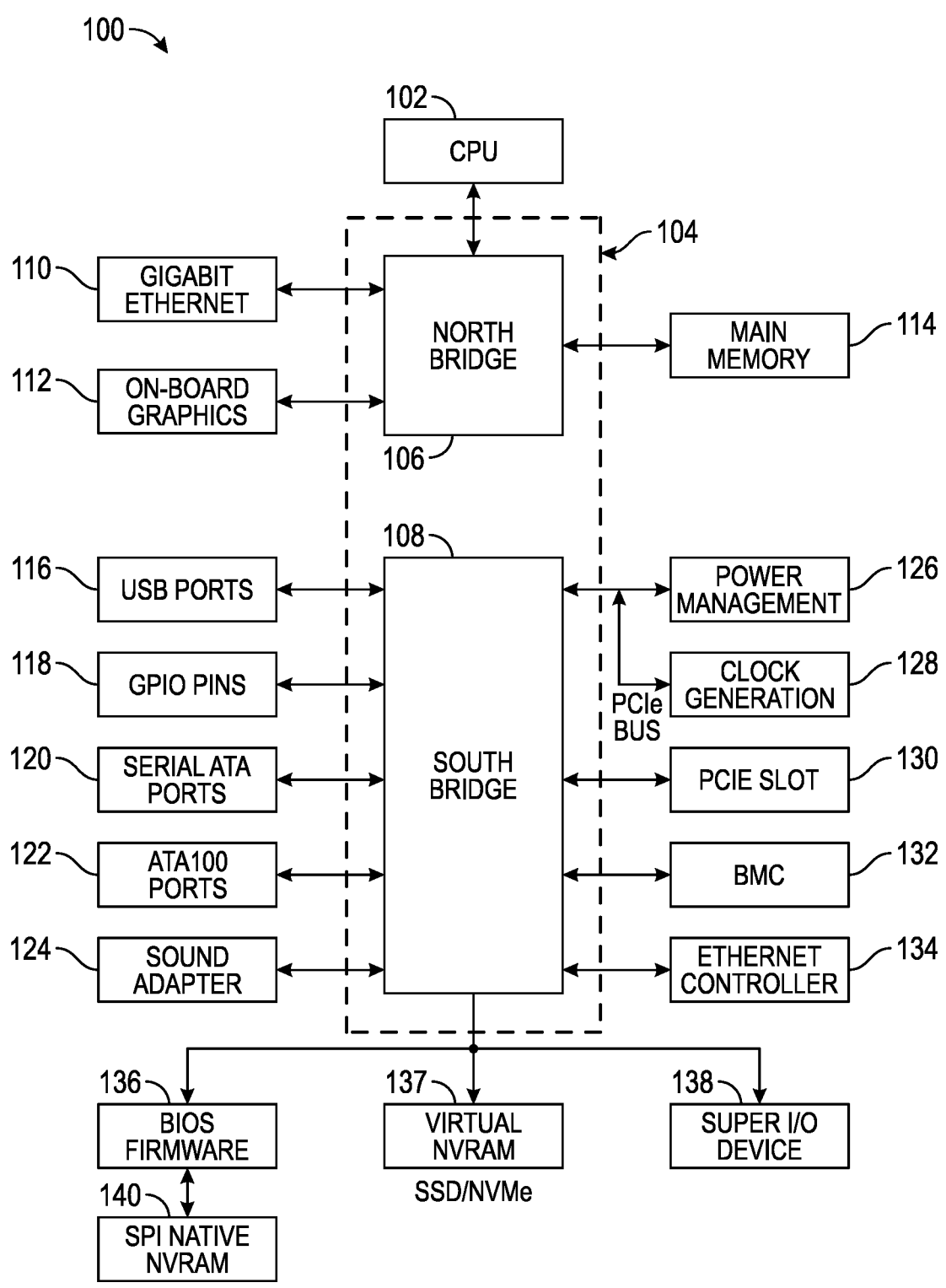
FIG. 1 shows an example of an Information Handling System (IHS) that may be configured to implement a system and method for caching SPDM-based certificates according to one embodiment of the present disclosure.

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard Specifications, such as the Intelligent Platform Management Interface (IPMI) and Systems Management Architecture of Server Hardware (SMASH) for computer system administration.

Baseboard management controllers (BMCs) are particularly well suited for the features provided by the Security Protocol and Data Model (SPDM) specification. The SPDM specification has been published by the Platform Management Components Intercommunication (PMCI) Working Group of the Distributed Management Task Force (DMTF). A particular goal of the SPDM specification is to facilitate secure communication among the devices of a platform management subsystem. Examples of a platform management subsystem may include an Information Handling System (IHS), such as a desktop computer, laptop computer, a cellular telephone, a server, and the like.

The SPDM specification defines messages and procedures for secure communication among hardware devices, which includes authentication of hardware devices and session key exchange protocols to provide secure communication among those hardware devices. Management Component Transport Protocol (MCTP) Peripheral Component Interconnect Express (PCIe) vendor defined message (VDM) channels, which supports peer-to-peer messaging (e.g., route by ID), allow a SPDM-enabled hardware device to issue commands to other SPDM-enabled hardware devices within a secure communication channel.

Cyber attackers are reportedly exploiting and abusing devices, such as platform interface protocol analyzers to steal unencrypted information, spy on network traffic, and gather information to leverage in future attacks against platform components and component interfaces (e.g., I2C, PCIe, I3C, Sensewire, SPI, etc.) of an IHS. Detection of vulnerable platform components is not an easy task, and exploiting unpatched vulnerabilities could allow the attacker to take control of the IHS. Some example platform security risks may include compromised security in which hostile component insertion and/or compromised firmware updates can cause supply chain security issues. Another example platform security risk may include confidentiality and integrity risks in which data transfers that are unencrypted may be vulnerable to eavesdropping, stealing, and tampering. Additionally, non-compliant security configuration errors, certificate management, platform security trust, and the like could lead to non-compliance with industry standard security policies. The DMTF SPDM specifications have been developed to alleviate such problems and reduce management overhead in maintaining and establishing the platform security within the IHS infrastructure domain.

A server, such as one configured in a data center, often uses multiple digital certificates. Examples of such digital certificates include SPDM BMC Identity certificates, SPDM Identity certificates of some, most, or all SPDM-enabled devices, SCV certificates, firmware alias certificates, and the like. Certificates that are bound to hardware are typically long lived. With hardware identity certificates for most or all devices, as the number of certificates that the system is required to manage increases over time, it could potentially give rise to problems associated with certificate sprawl. Alias certificates, which maps to specific versions of firmware, creates yet more certificates that need to be managed.

Currently, vendors provide large numbers of servers for their customers, and each server may be configured with multiple hardware devices and associated hardware bound certificates. Such large quantities of certificates may present certain management issues. For example, products, which may be discontinued, still possess valid certificates. Additionally, certain vendor certificates may become expired and should be renewed. In certain cases, the device certificate may be compromised and/or the BMC certificate used to manage such device may be compromised. Also, the BMC and device certificates may become revoked.

Given the relatively large amounts of certificates used in SPDM-enabled servers, it would be beneficial to cache (e.g., store) them in an organized and logical manner. The inventors of the present disclosure have recognized that while current industry practice has been to manage PKI certificates using a Certificate Transparency list (CT), managing hardware bound certificates has not yet been implemented. For example, the inventors have recognized that caching of hardware bound certificates in a CT list could alleviate the aforementioned problems with managing large quantities of SPDM-based certificates.

It has also been recognized by the inventors that caching of hardware bound certificates may alleviate problems associated with their transport due to bandwidth limitations of the communication links that transport such hardware bound certificates. For example, a server assembly may be configured with multiple digital certificates, such as SPDM identity certificates associated with the SPDM-enabled devices, and alias certificates associated with firmware that changes over time. Each node in a certificate chain can grow up to a size of four Kilobytes in memory, and each certificate chain can have approximately three to seven nodes. SPDM works over multiple interfaces (e.g., I2C, PCIe etc.), and certain Out-Of-Band (OOB) interfaces (e.g., I2C) can have lower bandwidth relative to other OOB interfaces (e.g., PCIe). As such, OOB requests are typically given lower priority compared to in-band interfaces when the responder shares the same hardware resources for in-band processing.

Fetching certificates over interfaces like I2C is slower compared to other OOB interfaces such as PCIe. The I2C interface is a multiplexing architecture that allows communication among other PCIe devices and hence the certificate fetching can be further delayed if there is high volume data transfer happening on other multiplexed slots. SPDM possesses a mechanism to fetch certificates after verifying a hash value of the certificate using the GetDigest SPDM command. But storing all the certificates in the BMC memory would not be efficient considering the size and number of certificates that needs to be managed. At the same time, fetching certificates from all devices in real-time can be unduly slow. Fetching certificates can be delayed further when the responder shares the same CPU for processing both OOB and in-band requests. These scenarios can exist regardless of the underlying medium being used for communication. For example, a few NVMe SSDs exist that do not have any dedicated micro controller to handle out-of-band communication. As will be described in detail herein below, embodiments of the present disclosure provide a system and method to cache hardware bound certificates, which rarely change or expire, in a manner that alleviates bandwidth limitations associated with interfaces used to convey the certificates.

Within this disclosure the configuration of a server refers to a number and type of hardware devices in the IHS as well as the settings for each of those hardware devices and of the server's main components, such as motherboard settings, BIOS settings, and the like. BMCs typically provide means to export a server profile associated with the existing configuration of a server (e.g., IHS). The exported server profile can then be applied to an existing or new target server. Conventionally, the BMC generates a Server Configuration Profile (SCP) that can be used to store the server profile so that it can be exported and/or imported to or from other servers. A drawback of the conventional SCP is that it stores the server profile in a plain text format (i.e., in the clear). Nevertheless, storing the server profile in plain text format presents several problems. For example, user settings including passwords (hash values) are exported in plain text format. Additionally, a low level of confidence in the integrity of the information stored in the server profile may exist because it can be easily modified. That is, the BMC on which these settings are being imported to does not know if the configuration has been tampered with or not. For another example, a user (e.g., Administrator of the server) may be required to apply these settings manually on each of the servers in a clustered environment. Embodiments of the present disclosure provide a solution to these problems, among others, by providing a system and method for cloning BMC profiles in a cluster environment that causes a target server to mutually authenticate with a source IHS 100, and uses security keys generated according to the mutual authentication process to encrypt the server profile at the source server, and decrypt it at the target server so that the integrity and security of information in the server profile remains intact.

FIG. 1 shows an example of an IHS 100 that may be configured to implement embodiments described herein. It should be appreciated that although certain embodiments described herein may be discussed in the context of a desktop or server computer, other embodiments may be utilized with virtually any type of IHS 100. Particularly, the IHS 100 includes a baseboard or motherboard, to which is a printed circuit board (PCB) to which components or devices are mounted by way of a bus or other electrical communication path. For example, Central Processing Unit (CPU) 102 operates in conjunction with a chipset 104. CPU 102 is a processor that performs arithmetic and logic necessary for the operation of the IHS 100.

Chipset 104 includes northbridge 106 and southbridge 108. Northbridge 106 provides an interface between CPU 102 and the remainder of the IHS 100. Northbridge 106 also provides an interface to a random access memory (RAM) used as main memory 114 in the IHS 100 and, possibly, to on-board graphics adapter 112. Northbridge 106 may also be configured to provide networking operations through Ethernet adapter 110. Ethernet adapter 110 is capable of connecting the IHS 100 to another IHS (e.g., a remotely located IHS) via a network. Connections which may be made by Ethernet adapter 110 may include local area network (LAN) or wide area network (WAN) connections. Northbridge 106 is also coupled to southbridge 108.

Southbridge 108 is responsible for controlling many of the input/output (I/O) operations of the IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as PCIe slot 130. In some embodiments, the bus may include a peripheral component interconnect (PCI) bus. Southbridge 108 may also provide baseboard management controller (BMC) 132 for use in managing the various components of the IHS 100. Power management circuitry 126 and clock generation circuitry 128 may also be utilized during operation of southbridge 108.

Additionally, southbridge 108 is configured to provide one or more interfaces for connecting mass storage devices to the IHS 100. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS 100 and allocation of resources. An application program is software that runs on top of the OS and uses computer resources made available through the OS to perform application-specific tasks desired by the user.

Mass storage devices connected to southbridge 108 and PCIe slot 130, and their associated computer-readable media provide non-volatile storage for the IHS 100. Although the description of computer-readable media contained herein refers to a mass storage device, such as a hard disk or CD-ROM drive, it should be appreciated by a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS 100 and to transfer information between elements within the IHS 100. BIOS/ firmware 136 comprises firmware compatible with the Extensible Firmware Interface (EFI) Specification and Framework.

The LPC interface may also be utilized to connect virtual NVRAM 137 (e.g., SSD/NVMe) to the IHS 100. The virtual NVRAM 137 may be utilized by BIOS/firmware 136 to store configuration data for the IHS 100. In other embodiments, configuration data for the IHS 100 may be stored on the same virtual NVRAM 137 as BIOS/firmware 136. The IHS 100 may also include a SPI native NVRAM 140 coupled to the BIOS/firmware 136.

BMC 132 may include non-volatile memory having program instructions stored thereon that enable remote management of the IHS 100. For example, BMC 132 may enable a user to discover, configure, and manage the IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of the IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state because iDRAC is embedded within the IHS 100 from the factory.

It should be appreciated that, in other embodiments, the IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize a different architecture.

According to embodiments of the present disclosure, the BMC 132 may support SPDM to manage the operation of one or more SPDM-enabled devices configured in the IHS 100. Examples of such SPDM-enabled devices include on-board graphics adapter 112, Ethernet adapter 110, USB ports 116, sound adapter 124, Ethernet controller 134, GPIO pins 118, PCIe slot 130, Power management circuitry 126, clock generation circuitry 128, serial ATA ports 120, ATA100 ports 122, virtual NVRAM 137, SPI native NVRAM 140, and Super I/O device 138 as described herein above. The SPDM specification provides for secure communication between the BMC 132 and the managed devices in the IHS 100. To meet this goal, the SPDM specification facilitates certificate chains that are stored in up to eight slots. Slot 0 is a default slot that is always used, while the other slots (e.g., slots 1-7) may be allocated for use by the administrator of the IHS 100. The SPDM spec also provides a slot mask that identifies each certificate chain.

Figure 2:
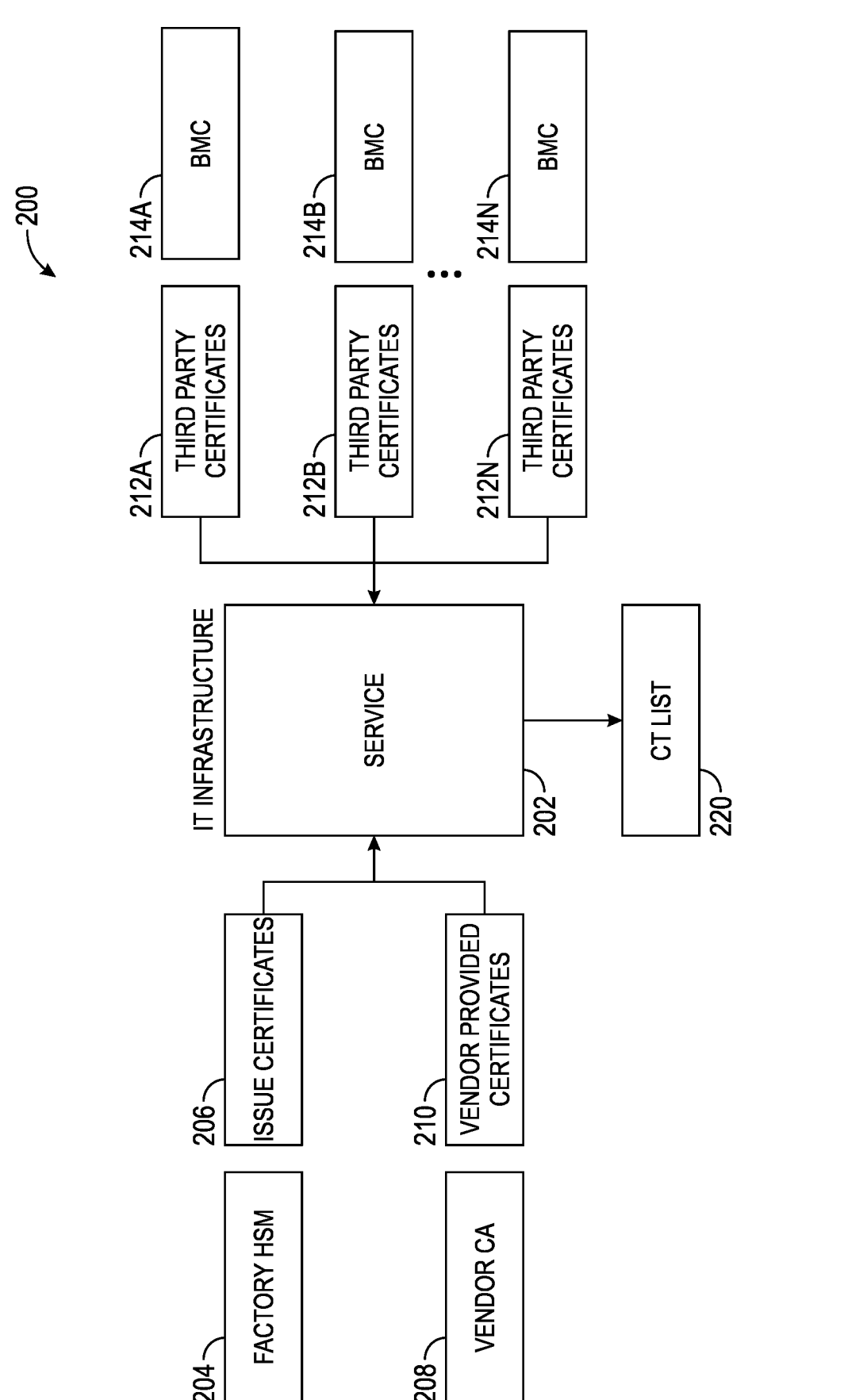
FIG. 2 illustrates an example SPDM-based certificate caching system according to one embodiment of the present disclosure.

FIG. 2 illustrates an example SPDM-based certificate caching system 200 according to one embodiment of the present disclosure. The SPDM-based certificate caching system 200 includes a CT list caching and monitoring service 202 that populates a CT list 220 that may be populated with entries (e.g., certificates) issued by one or more Certificate Authorities (CA), which in the present embodiment, may be a factory Hardware Security Module (HSM) 204 configured inside of, or external to an IHS 100 that the certificates 206 may be associated with, a vendor CA 208 that provides vendor provided certificates 210, and/or multiple BMCs 214*a-n* (collectively 214) that each issues certificates 212*a-n* (collectively 212) for their respective IHSs 100. While only an HSM 204, vendor CA 208, and BMCs 214 are shown, it should be appreciated that the SPDM-based certificate caching system 200 may be implemented for any number and type of publicly trusted CAs that generate SPDM-based certificates for hardware deployed in the IHS 100.

The CT list 220 generally involves a system of append only certificate logs or entries. In one embodiment, the CT list 220 conforms to the Request For Comment (RFC) 9162, which specifies how CT lists are to be implemented. The CT list 220 may be constructed as a Merkle tree data structure in which each log is labeled with the cryptographic hash of its child log, and each leaf log (e.g., last entered log) includes a hash of user data, which in the present embodiment, would be a SPDM-based certificate. Using this immutable structure, certificate inclusion may be verified via audits to ensure the validity of each log.

In terms of SPDM-based certificates, it would be beneficial to determine whether any SPDM-based certificates associated with the SPDM-enabled devices in an IHS 100 are invalid, and if so, disable the SPDM-enabled devices associated with the invalid certificate. SPDM-based certificates can become invalid for numerous reasons. Reasons for having an invalid certificate include expired certificates, the SPDM-enabled device associated with an invalid certificate may be restricted from use with that particular type of IHS 100, or the type of SPDM-enabled device is restricted from use with that particular IHS 100. Other reasons for having an invalid certificate exist.

The CT list caching and monitoring service 202 may be stored and executed by any suitable system internal or external to the IHS 100 whose Ct list 220 it is to manage and audit. For example, the CT list caching and monitoring service 202 may be stored and executed in a secure portion of the BMC 132 configured on the IHS 100. For another example, the CT list caching and monitoring service 202 may be stored and executed by a console, which monitors and controls the operation of the IHS 100. For example, the console may include at least a portion of the Dell EMC OpenManage Enterprise (OME) that is installed on a secure virtual machine (VM), such as a VMWARE Workstation. In general, the console may be used by a user, such as an administrator of the IHS 100, to manage the operation of the IHS 100 via the BMC 132.

Figure 3:
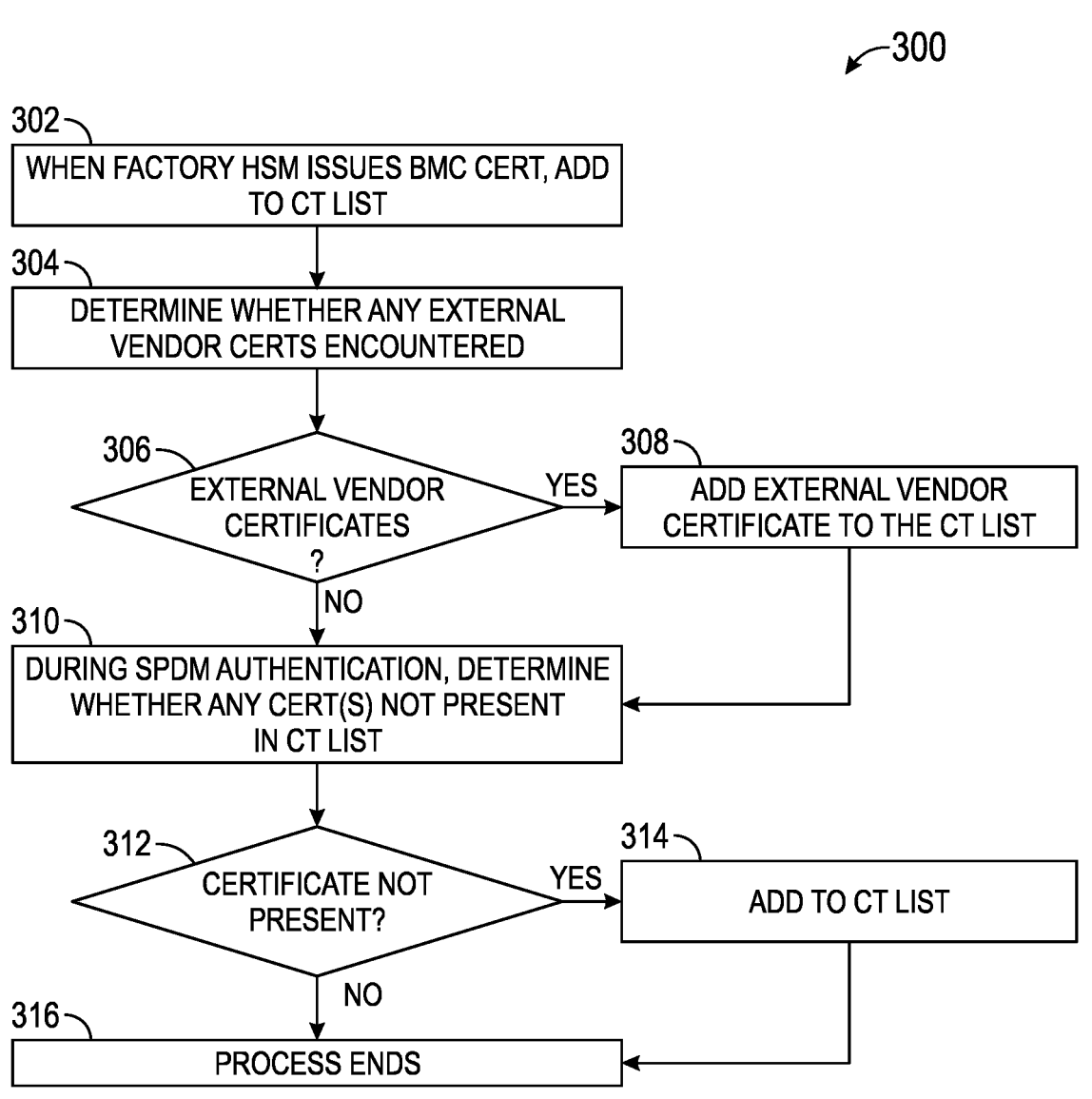
FIG. 3 illustrates an example SPDM-based certificate caching method showing how certificates can be managed using a Certificate Transparency (CT) list according to one embodiment of the present disclosure.

FIG. 3 illustrates an example SPDM-based certificate caching method 300 showing how certificates 206, 210, 212 can be managed using a CT list 220 according to one embodiment of the present disclosure. Additionally or alternatively, the SPDM-based caching method 300 may be performed at least in part, by the SPDM-based certificate caching system 200 as described herein above with reference to FIG. 2.

Initially at step 302, the factory HSM 204 adds a certificate 206 whenever one is generated for a SPDM-enabled device in the IHS 100. In some embodiments, the factory HSM 204 may function as a CA that operates in a factory provisioning setting and manages cryptographic operations and information on behalf of the manufacturer of the IHS. The method at step 304 determines whether any vendor provided certificates 210 are encountered. An external vendor certificate 210 may be, for example, one generated for a third party vendor CA that supplies a part (e.g., SPDM-enabled device) to be configured in the IHS 100. At step 306, the SPDM-based certificate caching method 300 determines whether any external vendor certificates 210 are encountered. If so, the vendor provided certificate(s) 210 are added to the CT list 220 at step 308; otherwise, processing continues at step 310 in which the SPDM-based certificate caching method 300 determines, during SPDM authentication, whether any certificates are not present in the CT list 220. In one embodiment, the SPDM-based certificate caching method 300 may perform step 310 any time SPDM authentication occurs, such as during a bootstrap process of the IHS 100. For example, the method 300 may compare its discovered list of certificates 206, 210, 212 against those included in the CT list 220 to identify any undocumented certificates. If so, processing continues at step 314 in which the SPDM-based certificate caching method 300 adds any undocumented certificates 206, 210, 212 to the CT list 220. The process ends at step 316.

The steps of the SPDM-based certificate caching method 300 described above may be performed throughout the serviceable life of the IHS 100. For example, either of the steps of the SPDM-based certificate caching method 300 may be performed each time a CA, such as the factory HSM 204, vendor CA 208, or a BMC 214 issues a certificate 206, 210, 212 to the IHS 100. For example, if an expansion card (e.g., NIC card) in the IHS 100 is replaced with another expansion card, the SPDM-based certificate caching and monitoring service 202 may detect the new certificate 212 associated with that new expansion card and add its associated certificate 212 to the CT list 220 when the IHS 100 is re-booted.

Figure 4:
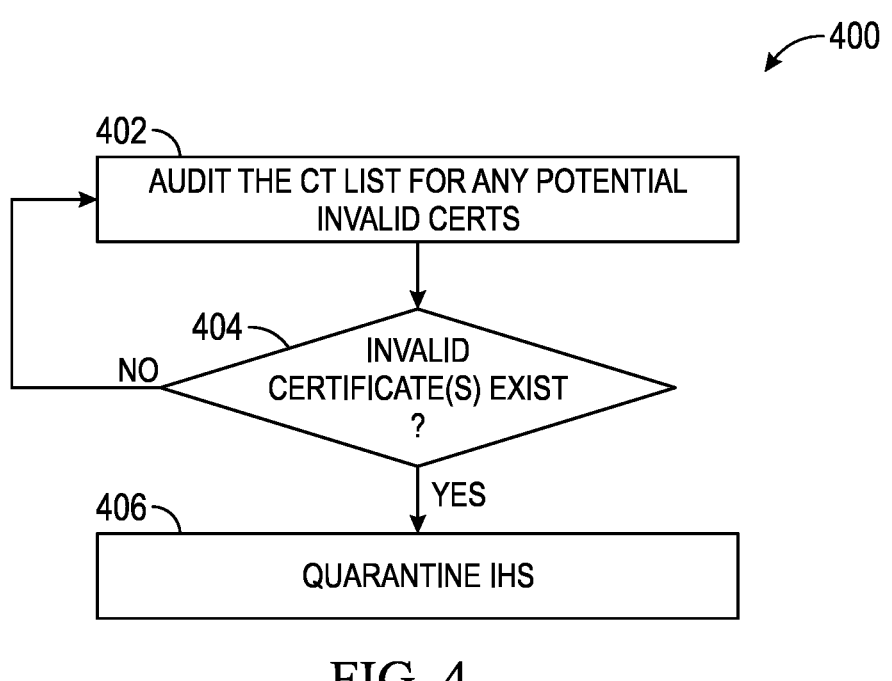
FIG. 4 illustrates an example SPDM-based certificate auditing method showing how the CT list may be audited according to one embodiment of the present disclosure.

FIG. 4 illustrates an example SPDM-based certificate auditing method 400 showing how the CT list 220 may be audited according to one embodiment of the present disclosure. Additionally or alternatively, the SPDM-based certificate auditing method 400 may be performed at least in part, by the SPDM-based certificate caching system 200 as described herein above with reference to FIG. 2. Initially, the SPDM-based certificate caching method 300 as described herein above has been performed to populate the CT list 220 with SPDM-based certificates 206, 210, 212 associated with the SPDM-enabled devices configured in the IHS 100. In one embodiment, the SPDM-based certificate monitoring method 400 is performed at ongoing intervals (e.g., periodically) to continually audit the CT list 220 for any invalid certificates 206, 210, 212. In another embodiment, the SPDM-based certificate auditing method 400 may be performed in response to a triggering event, such as during a system re-boot or in response to manual input from a user (e.g., administrator) of the IHS 100.

At step 402, the SPDM-based certificate auditing method 400 audits the CT list 220 for any potentially invalid certificates 206, 210, 212. For example, the SPDM-based certificate auditing method 400 may periodically communicate with the transparency list service and verify the certificates are valid in terms of the certificates available in transparency list for its own and the bounded hardware's' certificates 206, 210, 212. Thereafter at step 404, the SPDM-based certificate auditing method 400 determines whether any invalid certificates 206, 210, 212 exist. If so, processing continues at step 406 in which the IHS 100 is quarantined; otherwise, processing continues at step 402 for continual auditing of the CT list 220 associated with the IHS 100.

The IHS 100 can be quarantined in any suitable manner when an invalid certificate 206, 210, 212 is detected. In one embodiment, the SPDM-based certificate auditing service 202 may communicate with the BMC 214, which in turn, communicates with a BMC software agent running on the OS of the IHS 100 to stop communicating with the SPDM-enabled device associated with the invalid certificate 206, 210, 212 and disable the slot associated with the SPDM-enabled device. The BMC software agent may be, for example, an iDRAC service module (iSM) provided by DELL TECHNOLOGIES). In another embodiment, the SPDM-based certificate auditing service 202 may generate an alert message to notify responsible personnel about the invalid certificate 206, 210, 212. For example, the SPDM-based certificate auditing service 202 may generate an alert message, such as a support assist ticket, which is then sent to a vendor of the IHS 100 so that the vendor is notified about the discrepancy. Nevertheless, when use of the SPDM-based certificate auditing method 400 is no longer needed or desired, the method 400 ends.

Although FIGS. 3 and 4 describe example methods 300, 400 that may be performed to manage and audit a CT list 220 associated with an IHS 100, the features of the methods 300, 400 may be embodied in other specific forms without deviating from the spirit and scope of the present disclosure. For example, either of the methods 300, 400 may perform additional, fewer, or different operations than those described above. For another example, either of the methods 300, 400 may be performed in a sequence of steps different from that described above. As yet another example, certain steps of either of the methods 300, 400 may be performed by other components than those described above, such as by the BIOS configured in the IHS 100.

Figure 5:
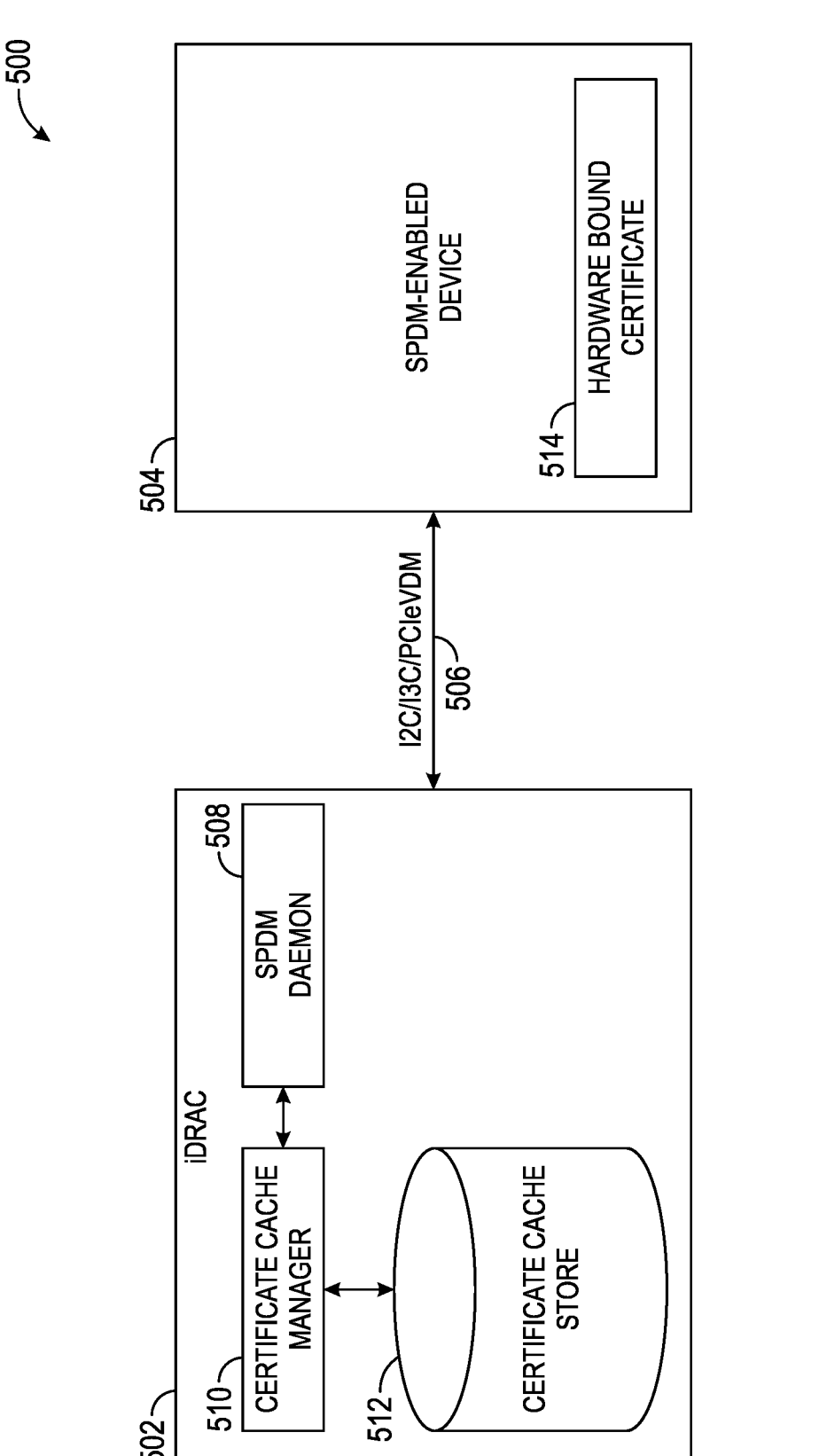
FIG. 5 illustrates another embodiment of a SPDM-based certificate caching system according to one embodiment of the present disclosure.

FIG. 5 illustrates another embodiment of a SPDM-based certificate caching system 500 according to one embodiment of the present disclosure. The SPDM-based certificate caching system 500 includes a BMC 502 in communication with a SPDM-enabled device 504 using a suitable communication interface 506, such as I2C, I3C, or PCIeVDM. The BMC 502 is configured with a SPDM daemon 508 that runs as a background process to fetch certificates over the communication interface 506. As described previously, performing SPDM authentication can unduly burden the communication interface 506, and may exist regardless of the underlying communication interface 506 used for communication. As will be described in detail herein below, embodiments of the present disclosure provide a system and method to cache hardware bound certificates, which rarely change or expire, in a manner that alleviates bandwidth limitations associated with the communication interface 506 used to convey the certificates.

According to embodiments of the present disclosure, the BMC 502 stores and executes a certificate cache manager 510 that caches hardware bound certificates 510 of one or more SPDM-enabled devices 504 in a certificate cache store 512 in a manner such that bandwidth limitations of the communication interface 506 are not unduly burdened. As described previously, certificates that are hardware bound rarely change, and thus it would be conducive to caching of those certificates in order to reduce bandwidth usage of the underlying communication interface 506. The SPDM-based certificate caching system 500 caches certain SPDM certificates in the BMC 502 based on the type of connected interface (e.g., I2C, I3C, or PCIeVDM) and speed of the SPDM-enabled device 504. The certificate cache manager 510 may determine whether to cache the certificate after issuing the SPDM 'GetCertificate' command. The certificate cache manager 510 may also determine whether to use the cached certificate and issue GetDigest to obtain the certificate from the certificate cache store 512, thus alleviating the need to get the hardware bound certificate from the SPDM-enabled device 504 and reducing the burden on the underlying communication interface 506.

Figure 6:
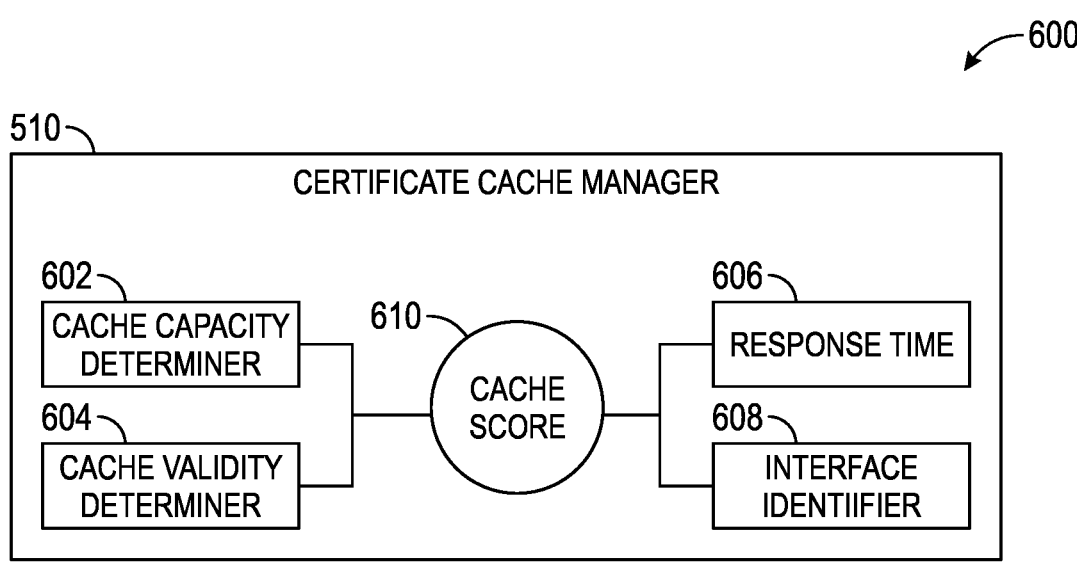
FIG. 6 illustrates several components of the SPDM-enabled device according to one embodiment of the present disclosure.

FIG. 6 illustrates several components of the SPDM-enabled device 504 according to one embodiment of the present disclosure. The components of the SPDM-enabled device 504 include a cache capacity determiner 602, a cache validity determiner 604, a response time counter 606, and an interface identifier 608 that may be used to generate a cache score 610 for each hardware bound certificate 514 in the IHS 100. That is, the SPDM-enabled device 504 may use the cache capacity determiner 602 to create or influence the cache score 610 based on the capacity level of the certificate cache store 512 (e.g., how much of the certificate cache store 512 is currently being used). For example, the capacity level of the certificate cache store 512 may be determined based on the dynamic size of the usable cache memory.

The SPDM-enabled device 504 may also use the cache validity determiner 604 to create or influence the caching score 610 based on the validity of the hardware bound certificate 514. The SPDM-enabled device 504 may additionally use the time response counter 606 to create or influence the caching score 610 based on the request to response time taken to complete 'GetCertificate' command. That is, the response time may be how long it takes for the SPDM daemon 508 to receive a response to the SPDM 'GetCertificate' command. For example, the response time may be derived from request and response time stamps of the SPDM 'GetCertificate' command.

The SPDM-enabled device 504 may additionally use the interface identifier 608 to create or influence the cache score 610 based on the type of communicating medium (e.g., I2C, I3C, or PCIeVDM). Although the present embodiment describes the use of a cache capacity determiner 602, a cache validity determiner 604, a response time counter 606, and an interface identifier 608 to generate a cache score 610 for each hardware bound certificate 514, other embodiment may use additional, fewer, or different algorithms for generating a cache score 610 without departing from the spirit or scope of the present disclosure.

The caching of the hardware bound certificate 514 is based on the caching score; the higher the score, the higher probability of getting the hardware bound certificate 514 cached. The certificate cache store 512 may be maintained as either non-volatile or volatile based on the memory availability. Additionally, the SPDM-enabled device 504 may remove the certificate 610 from the cache when its associated SPDM-enabled device 504 is removed from the IHS 100.

FIG. 7 illustrates an example SPDM-based certificate caching method 700 showing how certificates may be cached for alleviating bandwidth burdens on communication links according to one embodiment of the present disclosure. Additionally or alternatively, the SPDM-based certificate caching method 700 may be performed at least in part, by the SPDM-based certificate caching system 500 as described herein above with reference to FIGS. 5 and 6.

Initially at step 702, the IHS 100 is started and used in a normal manner. At step 704, the method 700 gathers data about each certificate that is fetched. For example, the method 700 may gather data as SPDM authentication occurs, such as by use of the 'getCertificate' command where the SPDM daemon 508 request the certificate 514 of a SPDM-enabled device 504. In one embodiment, the requested certificate 514 may be a hardware bound certificate due to its relatively long life. The data may include any type of data that can be used to generate a cache score 610. In one embodiment, the gathered data may include a cache capacity obtained from a cache capacity determiner 602, a cache validity obtained from a cache validity determiner 604, a response time obtained from a response time counter 606, and/or an interface type obtained from an interface identifier 608.

The method 700, for each certificate 514 generates a cache score 610 at step 706. In one embodiment, the cache score 610 may be generated according to weightings applied to each of multiple aspects (e.g., cache capacity, cache validity, response time, interface type, etc.) of how the certificates 510 are obtained. At step 708, the method 700 determines certain certificates 510 that are to be added and/or deleted from the certificate cache store 512. That is, the method 700 may store those certificates 510 having the highest cache score 610 in the certificate cache store 512. In some cases, the method 700 may replace a certificate 514 stored in the certificate cache store 512 with another certificate 514 due to it having a higher cache score 610. The method 700 then adds and/or replaces those certificates 510 in the certificate cache store 512 at step 710. At step 712, the method 700 then notifies the SPDM daemon 508 about certificates that have been cached so that the SPDM daemon 508 may obtain those cached certificates 510 from the certificate cache store 512 rather than directly from the SPDM-enabled device 504. The method 700 may then continue processing at step 704 to continually update the certificate cache store 512 so that those certificates 510 that affect the bandwidth capabilities of the interface 506 the most can be cached.

The aforedescribed method 700 may be continually performed for optimizing the certificates 510 that are cached in the certificate cache store 512. Nevertheless, when use of the SPDM-based certificate caching method 700 is no longer needed or desired, the SPDM-based certificate caching method 700 ends.

Although FIG. 7 describes an example method 700 that may be performed to cache certificates 510, the features of the method 700 may be embodied in other specific forms without deviating from the spirit and scope of the present disclosure. For example, the method 700 may perform additional, fewer, or different operations than those described above. For another example, the method 700 may be performed in a sequence of steps different from that described above. As yet another example, certain steps of the method 700 may be performed by other components than those described above, such as by the BIOS configured in the IHS 100.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and Including) and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) comprising:
at least one memory coupled to at least one processor, the at least one memory having program instructions stored thereon that, upon execution by the at least one processor, cause the IHS to:
obtain a certificate from a Security Protocol and Data Model (SPDM)-enabled device configured in a target computing device;
identify a Certificate Transparency (CT) list associated with the target computing device;
determine whether the certificate is a hardware bound certificate; and
store the certificate in the CT list based upon the determination;
obtain data associated with how the certificate is obtained from an associated SPDM-enabled device, wherein the obtained data comprises at least one of a capacity of the CT list and a response time to obtain the certificate from the SPDM-enabled device;

generate a score based upon the obtained data; and
add the certificate to the CT list or remove the certificate from the CT list based upon the score.

2. The IHS of claim 1, wherein the program instructions, upon execution, further cause the IHS to:
for each SPDM-enabled device deployed in the target computing device, add a hardware bound certificate associated with the SPDM-enabled device to the CT list; and
when one of the SPDM-enabled devices is removed from the target computing device, remove its hardware bound certificate associated with the one SPDM-enabled device from the CT list.

3. The IHS of claim 2, wherein the program instructions, upon execution, further cause the IHS to:
at an ongoing basis, determine whether any of the certificates are valid or invalid; and
when one of the certificates is determined to be invalid, perform one or more remedial actions.

4. The IHS of claim 3, wherein the one or more remedial actions comprise at least one of:
stop communicating with the SPDM-enabled device associated with the one certificate, disable a slot associated with the SPDM-enabled device, and generate an alert message indicating the invalid certificate.

5. The IHS of claim 1, wherein the program instructions, upon execution, further cause the IHS to:
notify a SPDM daemon that the certificate is to be obtained from the CT list.

6. The IHS of claim 5, wherein the program instructions, upon execution, further cause the IHS to obtain the data during a SPDM authentication process.

7. The IHS of claim 5, wherein the program instructions, upon execution, further cause the IHS to remove the certificate from the CT list or replace another certificate with the certificate based upon the score.

8. The IHS of claim 1, wherein the program instructions are performed by a Baseboard Management Controller (BMC) configured in the IHS.

9. A Security Protocol and Data Model (SPDM)-based certificate caching method comprising:
obtaining a certificate from a SPDM-enabled device configured in a target computing device;
identifying a Certificate Transparency (CT) list associated with the target computing device;
determining whether the certificate is a hardware bound certificate; and
storing the certificate in the CT list based upon the determination;
obtaining data associated with how the certificate is obtained from an associated SPDM-enabled device, wherein the obtained data comprises at least one of a capacity of the CT list and a response time to obtain the certificate from the SPDM-enabled device;
generating a score based upon the obtained data; and
adding the certificate to the CT list or removing the certificate from the CT list based upon the score.

10. The SPDM-based certificate caching method of claim 9, further comprising:
for each SPDM-enabled device deployed in the target computing device, adding a hardware bound certificate associated with the SPDM-enabled device to the CT list; and
when one of the SPDM-enabled devices is removed from the target computing device, removing its hardware bound certificate associated with the one SPDM-enabled device from the CT list.

11. The SPDM-based certificate caching method of claim 10, further comprising:

at an ongoing basis, determining whether any of the certificates are valid or invalid; and when one of the certificates is determined to be invalid, performing one or more remedial actions comprising at least one of stopping communication with the SPDM-enabled device associated with the one certificate, disabling a slot associated with the SPDM-enabled device, and generating an alert message indicating the invalid certificate.

12. The SPDM-based certificate caching method of claim 9, further comprising:

notifying a SPDM daemon that the certificate is to be obtained from the CT list.

13. The SPDM-based certificate caching method of claim 12, further comprising obtaining the data during a SPDM authentication process.

14. The SPDM-based certificate caching method of claim 12, further comprising removing the certificate from the CT list or replacing another certificate with the certificate based upon the score.

15. A computer program product comprising a non-transitory computer readable storage medium having program instructions stored thereon that, upon execution by a Baseboard Management Controller (BMC), cause the BMC to:

obtain a certificate from a Security Protocol and Data Model (SPDM)-enabled device configured in a target computing device;

identify a Certificate Transparency (CT) list associated with the target computing device;

determine whether the certificate is a hardware bound certificate; and store the certificate in the CT list based upon the determination;

obtain data associated with how the certificate is obtained from an associated SPDM-enabled device, wherein the obtained data comprises at least one of a capacity of the CT list and a response time to obtain the certificate from the SPDM-enabled device;

generate a score based upon the obtained data; and add the certificate to the CT list or remove the certificate from the CT list based upon the score.

16. The computer program product of claim 15, wherein the program instructions, upon execution, further cause the BMC to:

for each SPDM-enabled device deployed in the target computing device, add a hardware bound certificate associated with the SPDM-enabled device to the CT list; and when one of the SPDM-enabled devices is removed from the target computing device, remove its associated hardware bound certificate associated with the one SPDM-enabled device from the CT list.

17. The computer program product of claim 16, wherein the program instructions, upon execution, further cause the BMC to:

at an ongoing basis, determine whether any of the certificates are valid or invalid; and when one of the certificates is determined to be invalid, perform one or more remedial actions comprising at least one of stopping communication with the SPDM-enabled device associated with the one certificate, disabling a slot associated with the SPDM-enabled device, and generating an alert message indicating the invalid certificate.

18. The computer program product of claim 15, wherein the program instructions, upon execution, further cause an Information Handling System (IHS) to:

obtain data associated with how the certificate is obtained from an associated SPDM-enabled device;

generate a score based upon the obtained data;

add the certificate to the CT list or remove the certificate from the CT list based upon the score; and notify a SPDM daemon that the certificate is to be obtained from the CT list.

19. The computer program product of claim 18, wherein the program instructions, upon execution, further cause the IHS to obtain the data during a SPDM authentication process.

* * * * *